US012532140B2

(12) United States Patent
Singh

(10) Patent No.: US 12,532,140 B2
(45) Date of Patent: Jan. 20, 2026

(54) SPATIAL AUDIO PROCESSING FOR ELECTRONIC AUDIO REPRODUCTION

(71) Applicant: Citrix Systems, Inc., Fort Lauderdale, FL (US)

(72) Inventor: Manbinder Pal Singh, Coral Springs, FL (US)

(*) Notice: Subject to any disclaimer, the term of this patent is extended or adjusted under 35 U.S.C. 154(b) by 771 days.

(21) Appl. No.: 17/718,532

(22) Filed: Apr. 12, 2022

(65) Prior Publication Data

US 2023/0328471 A1 Oct. 12, 2023

(51) Int. Cl.
H04S 7/00 (2006.01)

(52) U.S. Cl.
CPC .......... H04S 7/302 (2013.01); *H04S 2400/01* (2013.01); *H04S 2400/11* (2013.01); *H04S 2420/01* (2013.01)

(58) Field of Classification Search
None
See application file for complete search history.

(56) References Cited

U.S. PATENT DOCUMENTS

| | | | | |
|---|---|---|---|---|
| 9,699,583 B1* | 7/2017 | Lyren | ...................... | H04S 7/304 |
| 11,805,385 B2* | 10/2023 | Watanabe | ............... | H04S 7/305 |
| 2008/0219484 A1* | 9/2008 | Strauss | ..................... | H04S 7/30 |
| | | | | 381/300 |
| 2018/0213344 A1* | 7/2018 | Laaksonen | .............. | G06F 3/012 |
| 2020/0037093 A1* | 1/2020 | Cummings | .......... | G11B 27/031 |
| 2020/0077221 A1* | 3/2020 | Tammam | ................. | H04R 5/04 |
| 2021/0377062 A1* | 12/2021 | Stevens | ................... | H04N 7/157 |
| 2022/0103962 A1* | 3/2022 | Munoz | ..................... | G06F 3/167 |
| 2022/0286311 A1* | 9/2022 | Rowe | ...................... | H04L 65/80 |
| 2023/0032545 A1* | 2/2023 | Mindlin | ............... | H04L 65/765 |
| 2023/0077102 A1* | 3/2023 | Eronen | ............. | G02B 27/0172 |
| 2023/0209294 A1* | 6/2023 | Brodersen | .............. | H04S 7/304 |
| | | | | 381/303 |
| 2023/0209301 A1* | 6/2023 | Jarvinen | ............... | A63F 13/573 |
| | | | | 345/156 |
| 2025/0031003 A1* | 1/2025 | Falk | ........................ | H04S 7/303 |

* cited by examiner

*Primary Examiner* — Qin Zhu

(57) ABSTRACT

Spatial audio processing allows for the replication of real-world audio behavior. In some cases, audio sources may be associated with respective spatial audio areas that define which other individuals or objects are recipients of audio generated by the respective audio source. For example, individuals or objects within a spatial audio area will receive audio generated by an associated audio source, but not individuals or objects outside of that spatial audio area. These spatial audio areas may be dynamically re-shaped, re-sized, and/or re-located based on contextual analysis includes clustering analysis and evaluating ambient attributes and user intent. Contextual cues may include grouping of audio sources or a purpose of the environment, while ambient attributes may include characteristics of environmental objects (e.g., furniture) as well as temperature, ambient noise levels, and the like. Additionally, in some examples, user intent may be discerned based on movements and audio content.

18 Claims, 14 Drawing Sheets

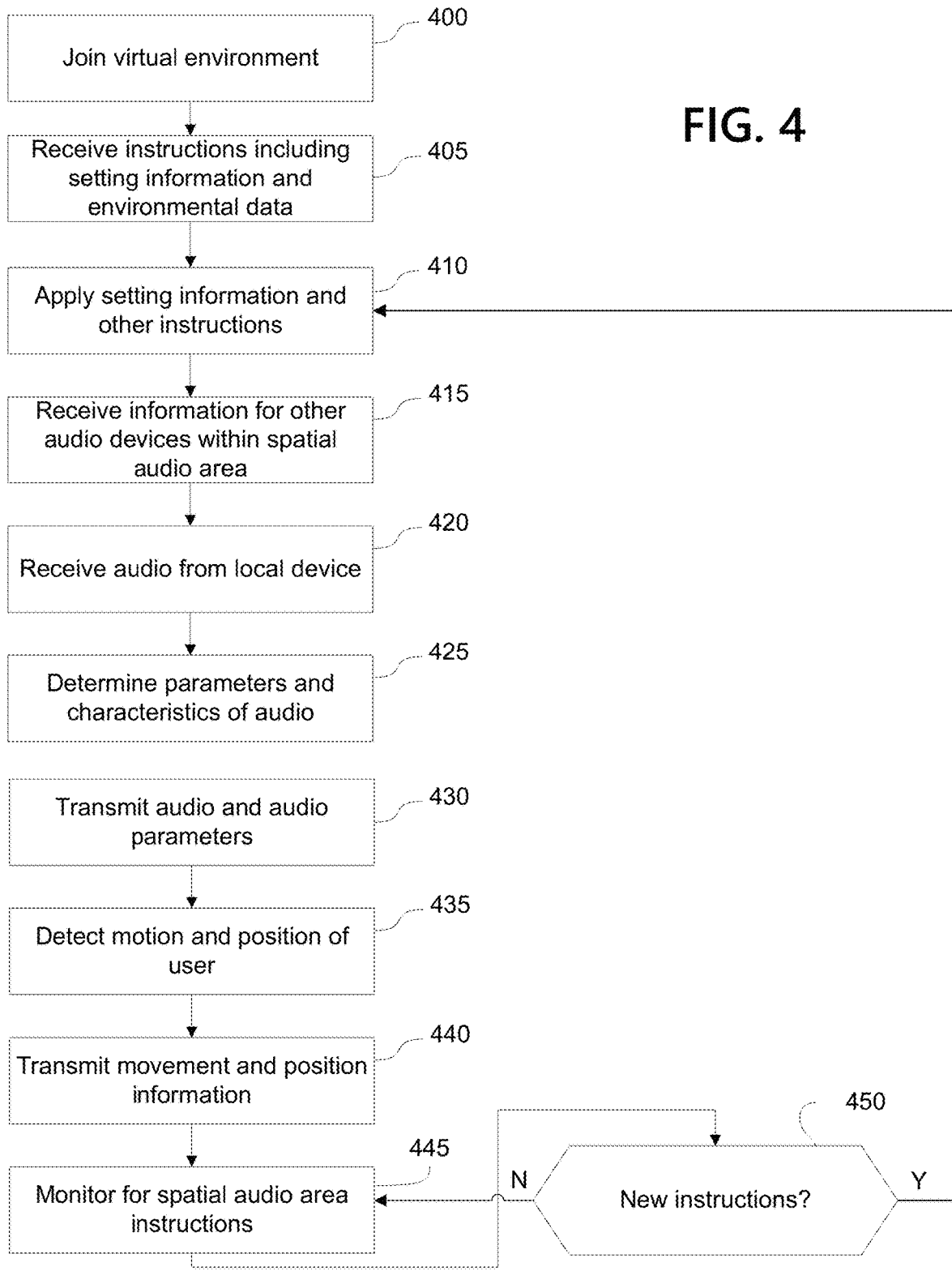

SPATIAL AUDIO PROCESSING FOR ELECTRONIC AUDIO REPRODUCTION

FIELD

Aspects described herein generally relate to electronic audio processing and reproduction. More specifically, one or more aspects described herein provide improved audio reproduction by simulating audio behavior with contextual and environmental factors within a virtual or physical environment.

BACKGROUND

Audio processing allows for the electronic reproduction of sound for a variety of purposes. From amplifying real-world sounds to giving life to video programming to enabling communications over long-distances, audio processing underlies many of our real-world activities. And as virtual environments, such as meta-verses, become increasingly prevalent, audio processing has gained increasing importance to enable replication of real-world sound in such contexts.

Current audio processing techniques do very little to address spatial attributes of sound reproduction. Spatial attributes include the shape and size of an audio space in which audio from a particular source is to be reproduced and outside of which that audio is not reproduced or otherwise provided. Spatial attributes can be helpful in replicating real-world audio behavior such as whispering, directional speaking, close group discussions, meetings and the like. In one example, remote conferencing platforms currently receive audio from a speaker and reproduce that audio to all parties in the conference equally. In another example, voice or speech-enabled virtual environments have fixed sound reproduction parameters. None of these instances use a system or process to account for various contextual or environmental attributes such as a speaker's intent, a meeting or environmental purpose, ambient objects (e.g., furniture, tables) or attributes (e.g., noise, temperature), and attributes of the sound itself (e.g., volume). Instead, existing audio processing techniques simply use predefined spatial areas that must be manually defined, modified or controlled by a user (e.g., a user of the virtual platform or an administrator).

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Systems and processes are needed to provide dynamic and automated shaping and sizing of spatial audio regions in order to improve the ability for virtual environments to reproduce real-world behavior. Additionally, dynamic spatial audio processing may improve the ability for sound processing systems to adapt to real-time changes in a particular environment.

Aspects described herein relate to dynamically identifying, sizing, and shaping spatial audio areas for audio reproduction. In one example, spatial audio processing may be context aware, taking into account environmental factors and audio source attributes such as the position of individuals (or more generally, audio receivers) within an environment, the volume and direction of audio, and ambient factors including inanimate objects in the environment.

According to one or more aspects, a system and process may define audio source-specific spatial audio areas. For example, a virtual environment with multiple users may include a separate spatial audio area for each of those multiple users. Moreover, each of those spatial audio areas may be dynamically and separately modified (e.g., shape, size, location) based on a variety of factors. For example, a user's spatial audio area may be re-sized, re-shaped and/or re-located based on a clustering of the users an environment such that the spatial audio area of each user within a cluster match in shape, size, and/or location. This allows for all users in the cluster to hear and speak to one another, while preventing audio from being shared with any individuals or devices outside of the cluster.

According to another aspect, a spatial audio area processing system automatically modify a size, shape and/or location of an audio source's spatial audio area based on a user's intent. Examples of a user's intent may include a direction in which the user is speaking, a trajectory of a user's movement, and/or the user's volume. In another example, a user's intent may be determined based on a content of the user's speech.

According to another aspect, spatial audio area processing may be performed for objects such as audio speakers or the like that may similarly serve as an audio source.

According to yet other aspects, spatial audio area processing may be used in physical real-world environments to define and modify audio spaces.

In an embodiment of the present disclosure, one or more non-transitory computer readable media may be provided to perform one or more of the processes described herein.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 4 is a flowchart illustrating an example process by which an audio source may perform spatial audio modification in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect mounting, connecting, coupling, positioning and engaging.

Figure 1:
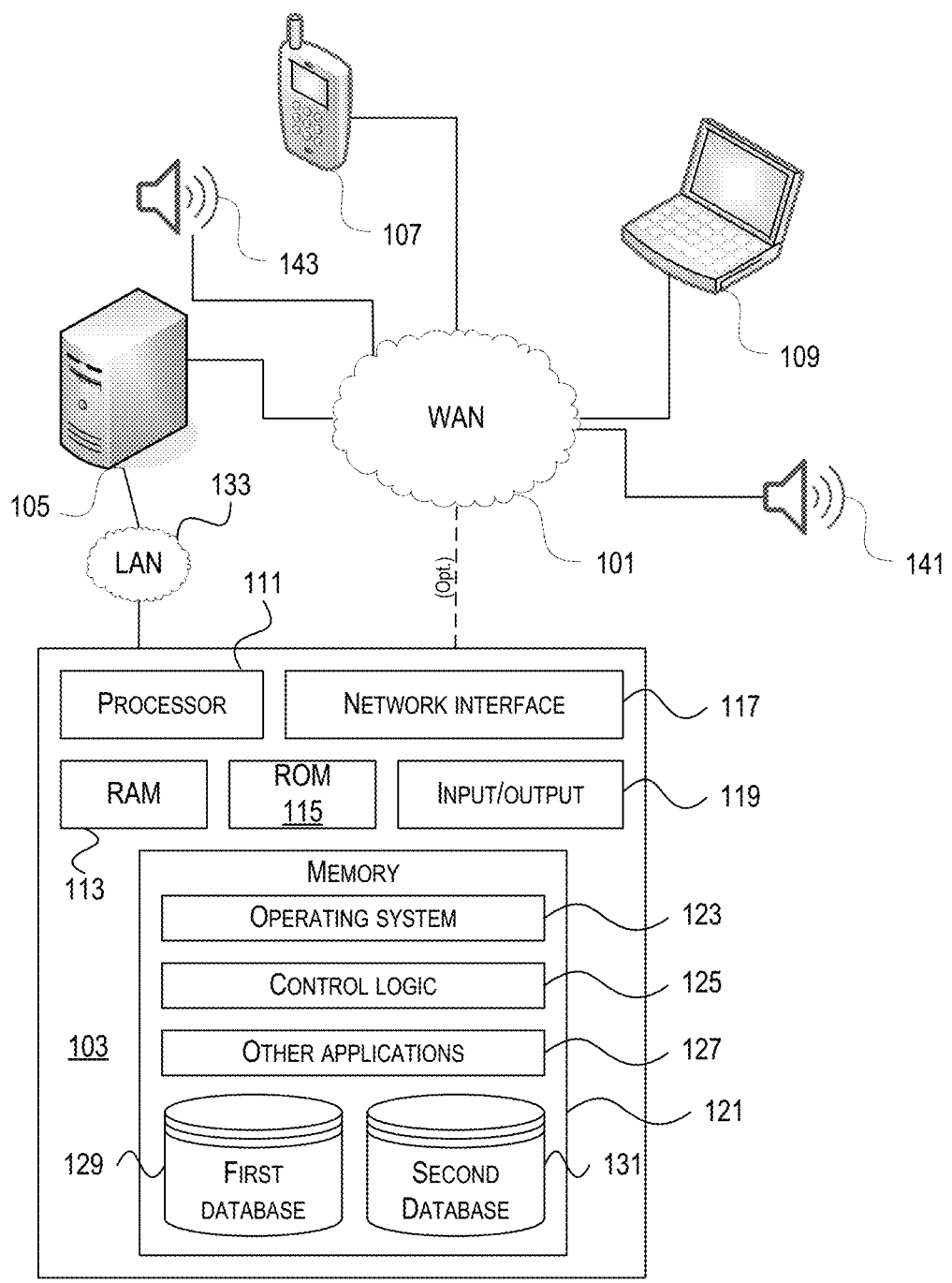
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through local area network 133, wide area network 101 (e.g., the Internet), via direct or indirect connection, or via some other network. Users may interact with the data server 103 using remote computers 107, 109, e.g., using a web browser to connect to data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

In some arrangements, data server 103 (or any of the other devices 105, 107, 109) may provide (e.g., host) a virtual environment such as a digital world in which users are represented by avatars or other objects. Users may view and interact with elements of the virtual environment using client devices such as client computers 107, 109, dedicated virtual reality equipment and the like. Client devices 107, 109 may include audio and video input and output devices to allow for sound and video interaction by the users with other users in the world or with other elements (e.g., objects such as machines, furniture, the environment and the like) within the digital world. In some configurations, the system may further include stand-alone audio and/or video devices 141, 143 (e.g., smart speakers, virtual assistant devices, microphones, etc.) connected to LAN 133 or WAN 101.

Each component 103, 105, 107, 109 may be any type of known computer, server, or data processing device. Similarly, stand-alone audio/video devices 141, 143 may each include a processor and memory for executing computer-readable instructions. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of data processing device 103, control logic 125 for instructing data server 103 to perform aspects described herein, and other application software 127 providing secondary, support, and/or other functionality which may or might not be used in conjunction with aspects described herein. Control logic 125 may also be referred to herein as data server software 125. Functionality of data server software 125 may refer to operations or decisions made automatically based on rules coded into control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, first database 129 may include second database 131 (e.g., as a separate table, report, etc.). That is, the information can be stored in a single database, or separated into different logical, virtual, or physical databases, depending on system design. Devices 105, 107, 109. 141, 143, 145, and 147 may have similar or different architecture as described with respect to device 103. Those of skill in the art will appreciate that the functionality of data processing device 103 (or device 105, 107, 109, 141, 143, 145, or 147) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The computing devices described with respect to FIG. 1 allow for the dynamic shaping, sizing, and locating of audio reproduction spaces referred to herein as spatial audio areas. An audio source, be it a human, an animal, an electronic device or other audio producing object, may be assigned a spatial audio area specific to that source. Objects and users within the spatial audio area of the source will receive the audio produced by the source, while those outside of the spatial audio area generally will not. In virtual environments, such spatial audio processing provides the ability to better mimic or replicate the real-world behavior of sound. For example, if a speaker whispers words to another user, the system may automatically re-shape, re-locate or re-size the speaker's spatial audio area within a virtual environment to replicate how a whisper would be perceived in the real-world. Similarly, if the speaker is within close proximity to a first group of users, spatial audio processing may provide dynamic re-sizing, re-locating or re-shaping of the speaker's spatial audio area to encompass all users within that first group, while excluding other users.

Figure 2:
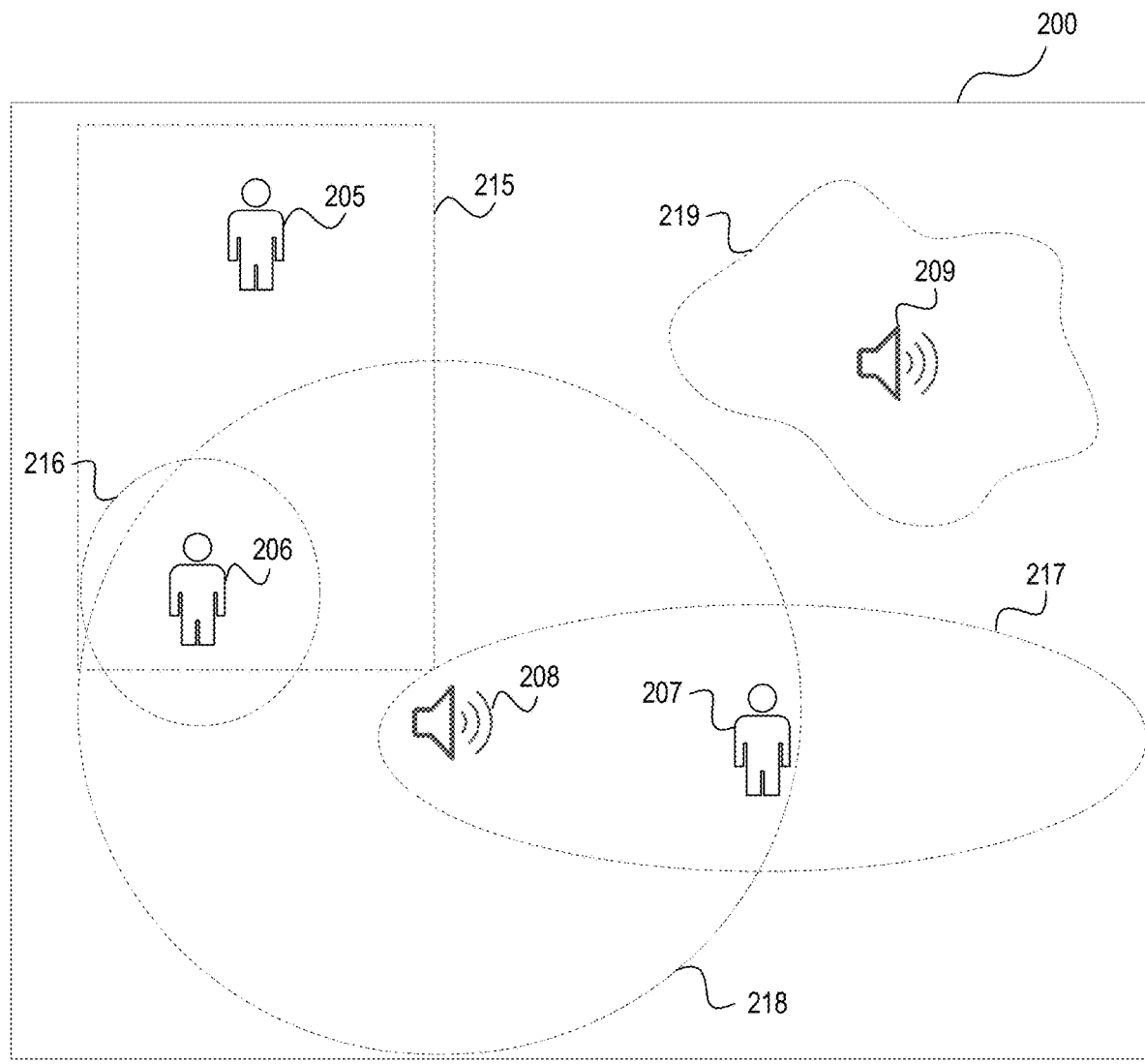
FIG. 2 depicts an illustrative environment in which multiple audio sources are associated with spatial audio areas in accordance with one or more illustrative aspects described herein.

FIG. 2 illustrates spatial audio areas corresponding to multiple audio sources located within an environment. The environment may be a physical real-world environment (e.g., a conference hall, a meeting room, house, office, etc.) or a virtual environment. Each audio source such as a human speaker, animal, electronic device with audio output and the like may be associated with a source-specific spatial audio area. This area defines the boundary within which audio sinks (or recipients) receive audio from the corresponding audio source. In environment 200, the audio sources include users 205, 206, and 207 as well as electronic audio devices 208, 209. Each of these audio sources are assigned a spatial audio area 215, 216, 217, 218, 219 that may be adjusted depending on various triggering events, as discussed in further detail below. In one example, these spatial audio areas 215, 216, 217, 218, 219 may move or re-located along with movement of the corresponding audio sources 205, 206, 207, 208, and/or 209, respectively. Additionally or alternatively, a size, direction, and shape of audio areas 215, 216, 217, 218, 219 may be changed based on various contextual factors such as volume of speech, content of speech, associated ambient elements (e.g., furniture, temperature, noise level), and user intent.

When an audio source generates a sound or other audio, only those recipients or audio sinks within the spatial audio area of the audio source receive that generated sound or audio. For example, if user 205 starts speaking, only user 206 will hear or otherwise receive the audio produced by user 205 because only user 206 is within the boundary of user 205's spatial audio area 215. Similarly, audio generated by device 208 might only be heard or received by users 206 and 207 since user 205 and device 209 are outside of device 208's spatial audio area 218. The size, shape, and directional attributes of each spatial audio area 215, 216, 217, 218, and 219 may be defined in a variety of ways and may be uniform or may differ (as shown in FIG. 2). Additionally, spatial audio areas might not be geometric. In some cases, the shape of a spatial audio area (e.g., spatial audio area 219) may be irregularly shaped.

Figure 3:
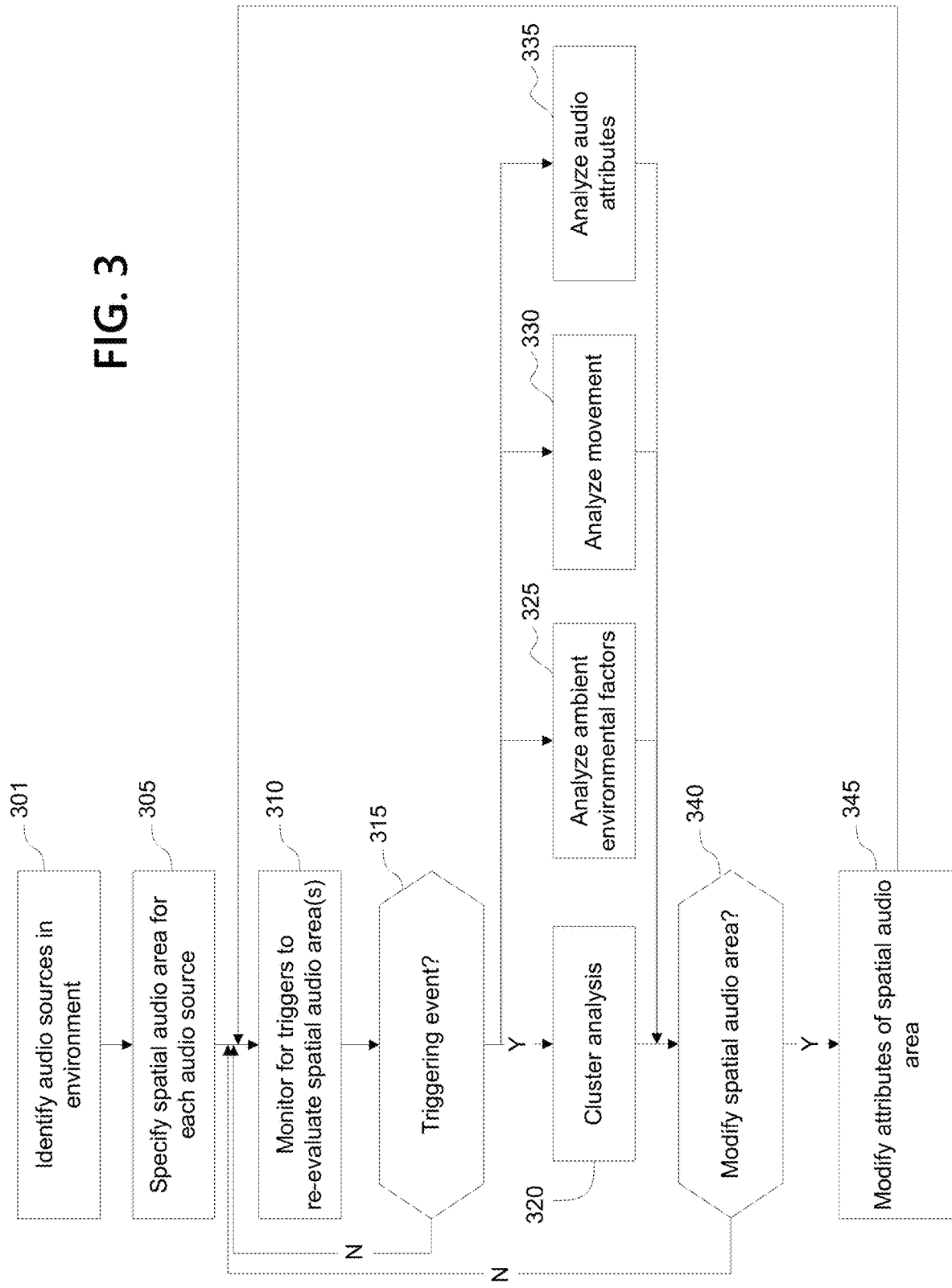
FIG. 3 is a flowchart illustrating an example process by which spatial audio areas may be dynamically and automatically modified according to various factors in accordance with one or more illustrative aspects described herein.

FIG. 3 is a flowchart illustrating an example process by which spatial audio areas may be dynamically and automatically modified based on contextual attributes or factors. In step 301, the spatial audio processing system may identify audio sources within a virtual environment. These audio sources may include inanimate objects such as electronic speakers, audio playback devices, musical instruments and the like, as well as animate objects including humans and animals. Each of these audio sources may be assigned a unique identifier so that each source is distinguishable from each other. In step 305, the processing system may specify a default spatial audio area for each of the audio sources, defining the area in which audio produced by the audio source is reproduced. Specifying the default area may include determining a current location of the audio source, identifying a predefined default size and shape of the spatial audio area, an orientation or direction of the audio area, and/or a predefined default audio source position within the spatial audio area. For example, a default shape may be an oval with a particular major axis diameter to minor axis diameter relationship. In another example, the default shape may be a circle with a predefined diameter. In yet another example, the default shape may be rectilinear or asymmetrical. A default position of the audio source may include, for example, a center of the audio area, on an edge of the audio area or somewhere in between. The orientation or direction of the spatial area may be defined based on various factors such as a direction in which the audio source is facing or directed, a default setting (user or system-based), and the like. In one example, the audio area may be oriented to be elongated in the direction in which the audio source is facing.

In steps 310 and 315, the audio processing system may monitor for one or more events serving as triggers for re-evaluating one or more of the defined spatial audio areas. These triggering events may include an initialization event, movement of a user (location or movement of a body part), change in a user's volume, audio content triggers, a user's association with an environmental object, timers, a pre-defined schedule and the like. In some arrangements, the monitoring and re-evaluation of spatial audio areas may be performed on a source-by-source basis. For example, the triggering events may be audio source-specific, including having different triggering events for different audio sources. In other arrangements, all or a proper subset of all spatial audio areas may be re-evaluated when a triggering event occurs.

Upon detecting a triggering event, the spatial audio processing system may analyze one or more contextual attributes to determine whether the spatial audio areas for one or more of the audio sources should be modified in steps 320, 325, 330, and 335. Contextual analysis may include multiple processes, including clustering, analyzing user intent, and evaluating ambient factors. For example, in step 320, the spatial audio processing system may perform cluster analysis by analyzing the locations of each of the audio sources using a clustering algorithm to determine groups within the virtual environment. Various clustering algorithms may be used including K-shift clustering, mean-shift clustering, density-based spatial clustering, and the like and/or combinations thereof. Once clusters of audio sources have been identified, the system may determine in step 340 whether the spatial audio areas of any of the audio sources needs to be adjusted based on the clustering. For example, if a spatial audio area for user A does not include each of users B and C that are identified as being part of the same cluster, the spatial audio area of user A may need to be enlarged or otherwise modified so as to include users B and C.

If modification is needed, the spatial audio areas may be modified in step 345 to align with the identified clusters. For example, the spatial audio area of each of the audio sources in a first cluster may be modified to match in size, shape, and position. Similarly, the spatial audio area of each of the audio sources in a second cluster may be adjusted to match one another. In some examples, the spatial audio areas for audio sources in a cluster might not be adjusted to match exactly. Instead, the spatial audio areas might only be adjusted so that all other audio sources in the same cluster are within each of the audio sources' spatial audio areas.

In some arrangements, a clustering algorithm may further consider user intent. Accordingly, the spatial audio processing system might not cluster an audio source into a first cluster if the audio source does not demonstrate an intent to join that first cluster of audio sources. In an example, if the system detects that an audio source is walking by a first cluster of individuals without stopping, the system may determine that the audio source does not intend to join the first cluster. Consequently, the system might not associate the audio source with the first cluster even though a known clustering algorithm might otherwise include that audio source in the first cluster based on their location and proximity to the first cluster at a particular moment. Other indications of intent may also be used in the clustering analysis in similar fashion.

In step 325, the spatial audio processing system may analyze ambient factors to evaluate whether adjustment to spatial audio areas is needed (step 340). Ambient factors may include virtual world objects or attributes such as furniture, vegetation, ambient noise, ambient temperature and the like. In the case of furniture, the processing system may determine spatial audio area adjustments based on whether an audio source is seated, standing next to, or otherwise positioned in association with a piece of furniture which has a spatial audio context. A table, for instance, provides a context of a meeting or discussion between individuals seated at the table. Similarly, a couch may provide a similar context of a private discussion between individuals seated on the couch or portions of the couch depending on the couch's shape and size. In some arrangements, these ambient elements may define a spatial audio boundary representing that context. For furniture, that boundary may be defined based on a shape of the furniture. Accordingly, in step 345, the spatial audio processing system may adjust a spatial audio area of an audio source associated with an ambient object based on the spatial audio boundary defined by that object. In one example, the spatial audio area of audio sources associated with the ambient object may be modified to match the audio boundary of the ambient object exactly. In another example, an audio source's adjusted spatial audio area might not match the ambient object's audio boundary exactly, and instead may be defined by an overlapping region between the ambient object's audio boundary and the audio source's pre-existing spatial audio area. Other methods for modifying an audio source's spatial audio area based on an associated ambient object's audio boundary may be used.

In step 330, the processing system may analyze one or more user movements, which may act as indicators of user intent. User movements may include the user moving location, a gesture by the user, or a movement of a portion of the user's body (e.g., head, arm, leg). The system may then determine whether the user movement is an indication that the user's spatial audio area should be adjusted in step 340. For example, if a user were to cup the user's hand to the user's mouth, that might indicate that the user intends to project the user's audio in a particular direction and/or in a private manner. In such a case, the user's spatial audio area size may be decreased, and a direction adjusted to match the direction in which the user is projecting audio. Similarly, if a user turns their head in a particular direction and speaks, the system may determine that the user's audio should be projected more in that particular direction and less in directions in which the user is not facing. Accordingly, the user's spatial audio area may be adjusted (e.g., size, shape, direction) to reflect the user's movement in step 345.

In step 335, the processing system may, additionally or alternatively, analyze an attribute of the audio produced by a particular source to determine whether an audio source's spatial area should be modified. These attributes may include a variety of parameters including volume and content. For example, if the audio source's volume has increased, the processing system may determine, in step 330, that the size of the audio source's spatial audio area should also be increased. The increase in the area may, in one example, be proportional to the increase in volume. In another example, the increase may be a predefined increase amount (e.g., a certain number of decibels). Conversely, if the source's volume decreases, the system may determine that the size of the spatial audio area should be decreased in like fashion.

The system may further use natural language processing to analyze the content of audio. Content analysis may reveal an intent of the audio source, which the system may then use to determine whether a spatial audio area should be modified (step 340). For example, if a user is in a first cluster and calls out to another user not in the first cluster, the other user would ordinarily not receive that audio since the other user is outside of the first cluster. However, by analyzing the content of the audio and determining that the user is calling out to the other user, the system may add the called user into the spatial audio area of the speaking user. In another example of content-based spatial modification, when a user says "Don't tell anyone else this" or a similar phrase using keywords or key phrases, the system may automatically determine that the user only intends for a user closest to the speaking user and/or positioned in the direction in which the speaking user is facing to hear the audio. In this case, the system may determine that the size, shape or location of the speaking user's spatial audio area is to be modified to encompass only that other user.

Accordingly, if either the content or volume or another attribute of a source's audio is determined to necessitate or otherwise warrant modification of the source's spatial audio area, the system may make a corresponding adjustment in step 345. Once an adjustment is made, the system may return to the monitoring process of step 310. This continuous monitoring of triggering events allows for dynamic and real-time adjustments of spatial audio areas to adapt to contextual factors.

The process of FIG. 3 may be performed by a spatial audio area processing system different from and/or separate from an audio source. However, in other arrangements, the process of FIG. 3 may be performed by one or more audio sources. In yet other arrangements, the process may be distributed between a processing system and one or more audio sources.

FIG. 4 illustrates a process by which an audio source may perform spatial audio modification. In step 400, an audio source computing device (e.g., a user's computer or VR headset or the like and/or combinations thereof) may join a virtual environment by providing information about the audio source such as a name, identifier, user credentials, audio settings, video settings, and the like. In step 405, the audio source computing device may receive instructions from a virtual environment system (e.g., including a spatial audio processing system) with setting information and/or virtual environment data. The setting information may include initial or default spatial audio area parameters for the audio source. The parameters may define a size, shape and/or location of the spatial audio area. In one example, the location of the audio source's spatial audio area may be defined based on the location of the audio source in the virtual environment. In some arrangements, the audio source's spatial audio area may be centered on the location of the audio source, or the location of the audio source may define a vertical or edge of the spatial audio area. In step 410, the audio source computing device may apply those instructions, including storing the initial audio parameters and virtual environment parameters and data. The instructions may also define a particular communication and/or security protocol for transmitting audio and/or other information such as motion or positional data to other users and/or to the virtual environment server.

In step 415, the audio source computing device may further receive, from a spatial audio area processing system, identifiers and/or addresses for other audio devices (e.g., sinks or sources) within the audio source's spatial audio area. For example, the spatial audio area processing system may provide the audio source computing device with a list of IP address or virtual environment identifiers that fall within the audio source's spatial audio area. In other examples, the audio source computing device might not receive such a list. Instead, the spatial audio area processing system or virtual environment server may manage the lists and direct audio as needed.

In step 420, audio source computing device may receive audio through a local audio device such as a microphone or video camera or the like. In step 425, the audio source computing device may determine parameters of the audio, including content, volume, cadence of speech, tone, and the like. In step 430, the audio source computing device may transmit the audio along with the audio parameters to the virtual environment server. In some examples, the audio source computing device may transmit the audio and audio parameters to devices within its spatial audio area based on the list received in step 410. In other examples, such distribution of audio may be performed by the virtual environment server.

In step 435, the audio source computing device may also detect motion and position of a user including changes in physical location, gestures, movements of body parts, changes in orientation and the like. This information may further be transmitted in step 440. The audio source computing device may monitor the user's motion and/or position based on a predefined schedule (e.g., every second, every 100 ms, every 5 seconds, etc.) and the information may be transmitted on that same schedule. In other examples, the audio source computing device may monitor the user's motion and/or position based on a schedule, but only transmit the information if and when a change in position or motion is detected. This may help to reduce usage of transmission bandwidth.

In steps 445 and 450, the audio source computing device may monitor for check whether spatial audio area instructions have been received in response to the transmitted audio and/or the transmitted motion or position information. If not, the audio source computing device may continue to monitor for audio from the user and user position changes or motion. If, however, the audio source computing device has received new spatial audio area instructions, the audio source computing device may apply those new parameters and instructions as shown in step 410.

Figure 5A:
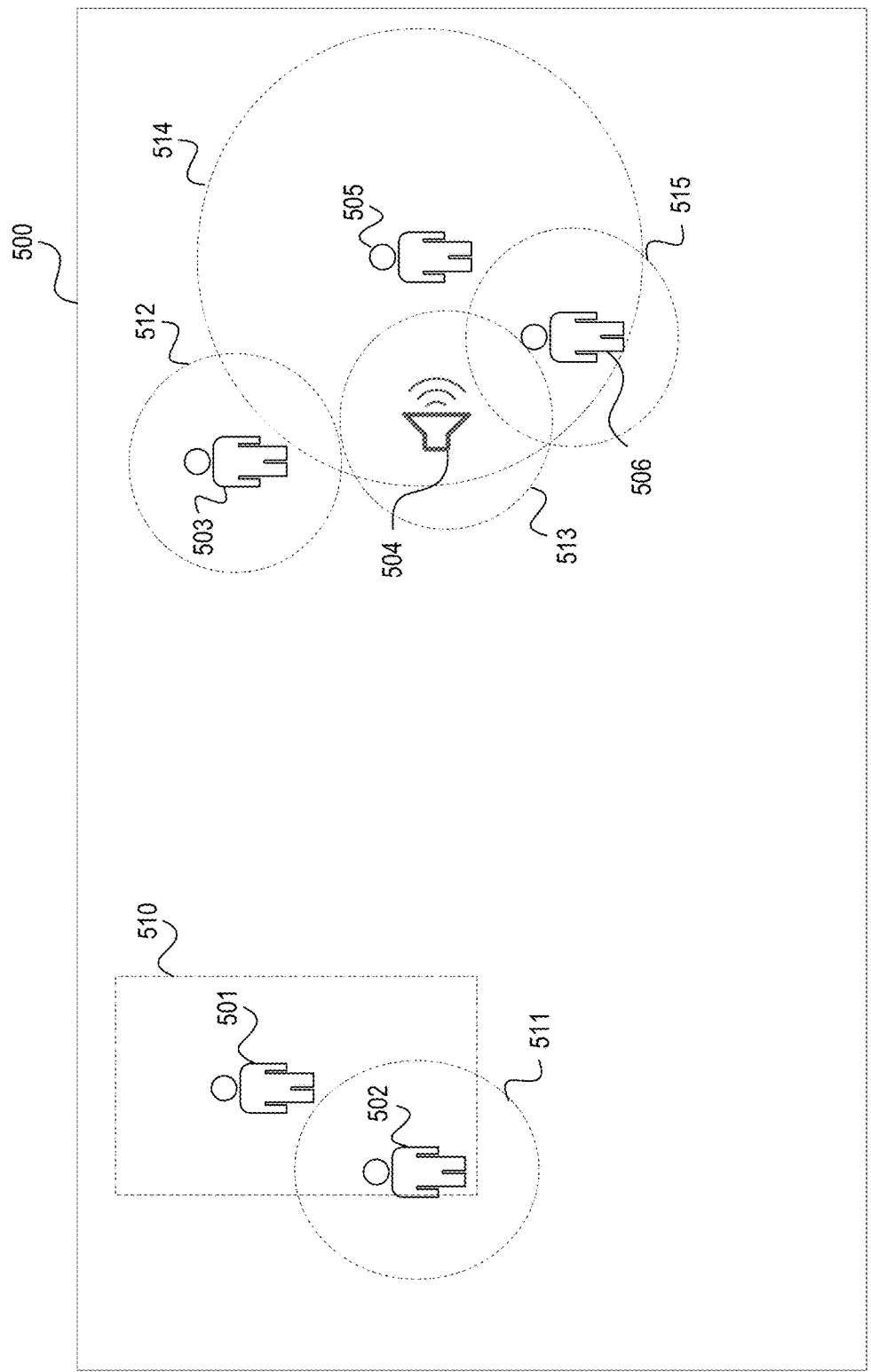
FIGS. 5A-5D illustrate examples of spatial audio modification based on grouping of audio sources and sinks in accordance with one or more illustrative aspects described herein.
Figure 5B:
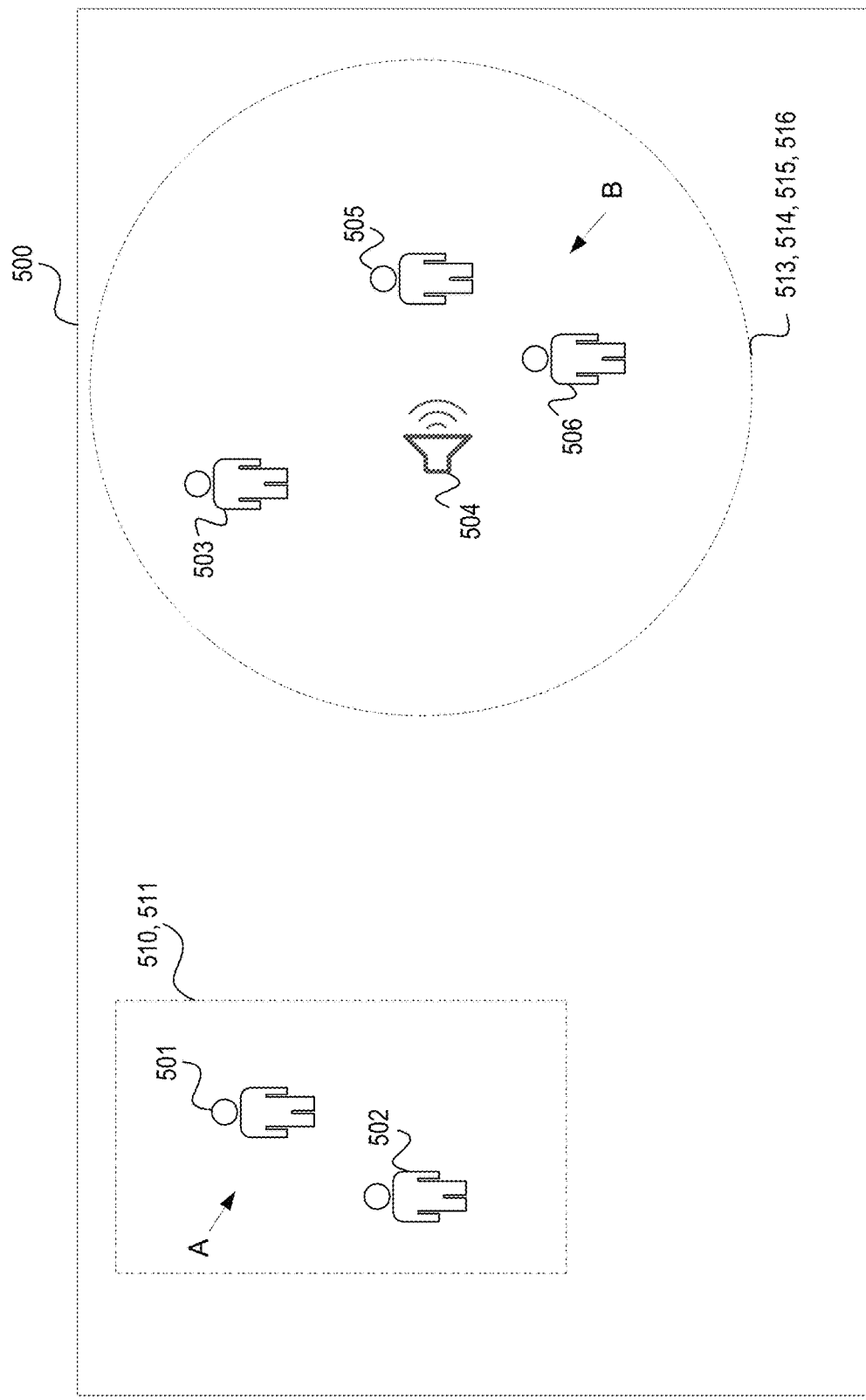

FIGS. 5A and 5B illustrate an example of spatial audio clustering and modifying spatial audio areas responsive to the clustering. FIG. 5A illustrates an arrangement of audio sources within a space 500 such as a virtual environment or physical area. Each of the audio sources 501-506 is associated with their own spatial audio area 510-515. Within space 500, audio source 501 and 502 are located in relative proximity to one another along a left-hand side of area 500 while audio sources 503-506 are located in relative proximity along a right-hand side of area 500. In a real-world context, sources 501 and 502 may be having one conversation while sources 503-506 may be having a different conversation. Additionally, sources 501 and 502, by virtue of their positioning away from sources 503-506, might not intend for their conversation to be heard by sources 503-506.

Similarly, for sources 503-506, those sources might not intend for their conversation to be heard by sources 501 and 502. However, using spatial audio areas 510-515 of a fixed size, shape or location, those contextual cues may not be reflected. Consequently, as shown in FIG. 5A, sources 504 and 506 may hear audio generated by source 505, while source 503 might not. Likewise, while audio source 502 is within spatial audio area 510 of source 501, source 501 is not within spatial audio area 511 of source 502. Accordingly, audio source 502 can hear source 501, but not the other way around. Such results may run counter to the intentions of the audio sources 501-506 based on the proximity with which they are positioned to one another within area 500.

Accordingly, a processing system performing the processes described in at least FIGS. 3 and 4, may dynamically modify the spatial audio areas 510-515 based on a clustering algorithm result. More specifically, upon executing a clustering analysis of the locations of audio sources 501-506, the processing system may determine that sources 501 and 502 belong to a first cluster, while sources 503-506 belong to a second cluster. A cluster may represent a group of audio sources that intend to share their generated audio with each of the other sources in that group. Once the clusters are identified, the processing system may adjust the spatial audio areas of one or more of the audio sources so that each source within a cluster receives the audio of each of the other sources within that cluster.

FIG. 5B illustrates one arrangement in which the spatial audio areas 510-515 (from FIG. 5A) are modified according to identified clusters A and B. In this configuration, the processing system may modify each of spatial audio areas 510 and 511 to match and include both audio sources 501 and 502. Similarly, the processing system may adjust each of spatial audio areas 512-515 to match and include each of audio sources 503-506.

Figure 5C:
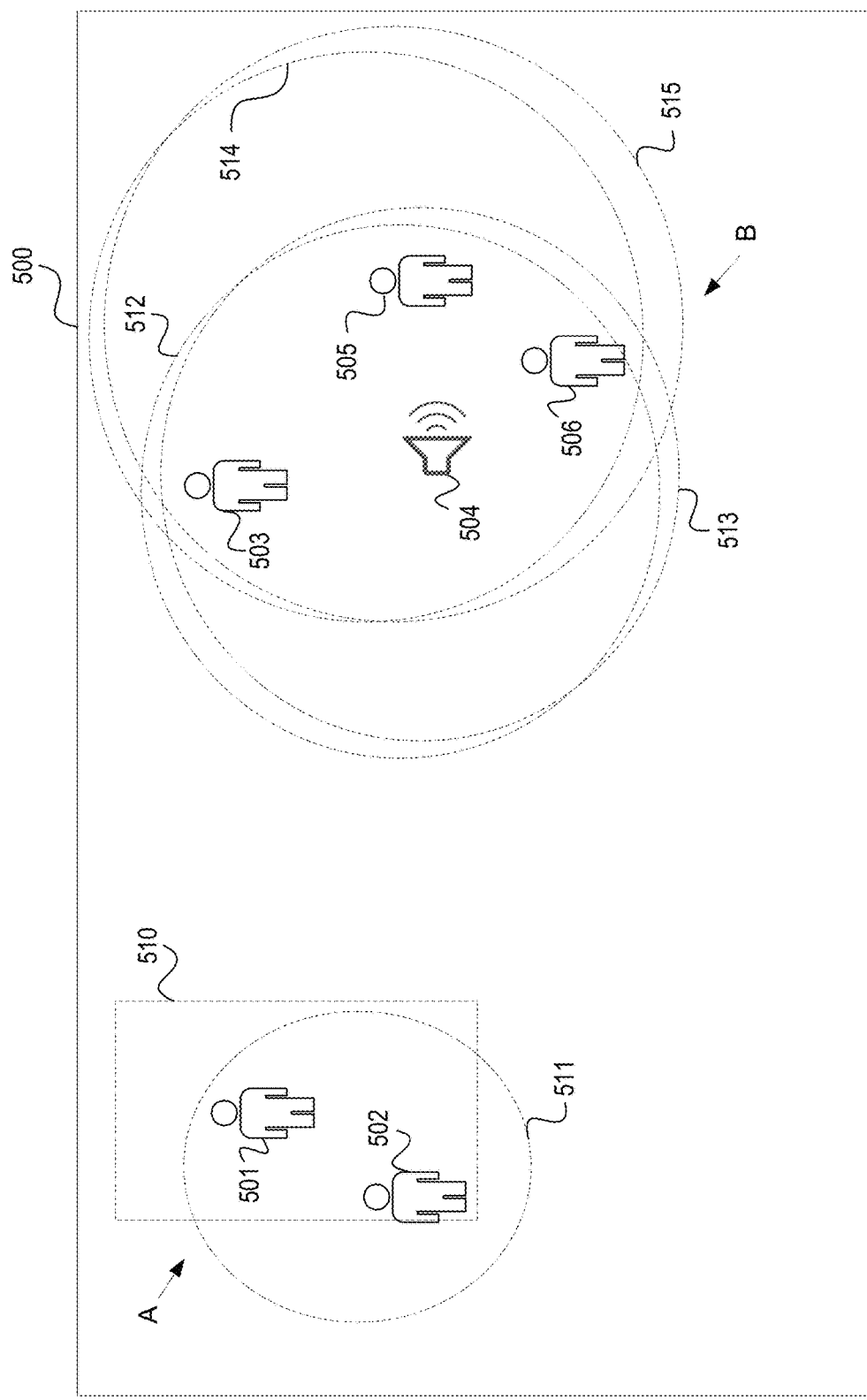

FIG. 5C illustrates a second arrangement in which spatial audio areas 510-515 may be modified according to identified clusters A and B. In this configuration, the spatial areas 513-515 do not match exactly, but are re-sized, re-shaped, and/or re-located so that each of the other audio sources 503-506 within cluster B are within each of spatial areas 513-515. In other words, an overlapping area of all spatial audio areas 513-515 encompasses the corresponding audio sources 503-506. A similar process may be performed for spatial areas 510 and 511. In particular, spatial audio area 510 might not be modified since it already includes both audio sources 501 and 502. Instead, only spatial audio area 511 of audio source 502 may be modified in size, location and shape in order to include audio source 501.

Figure 5D:
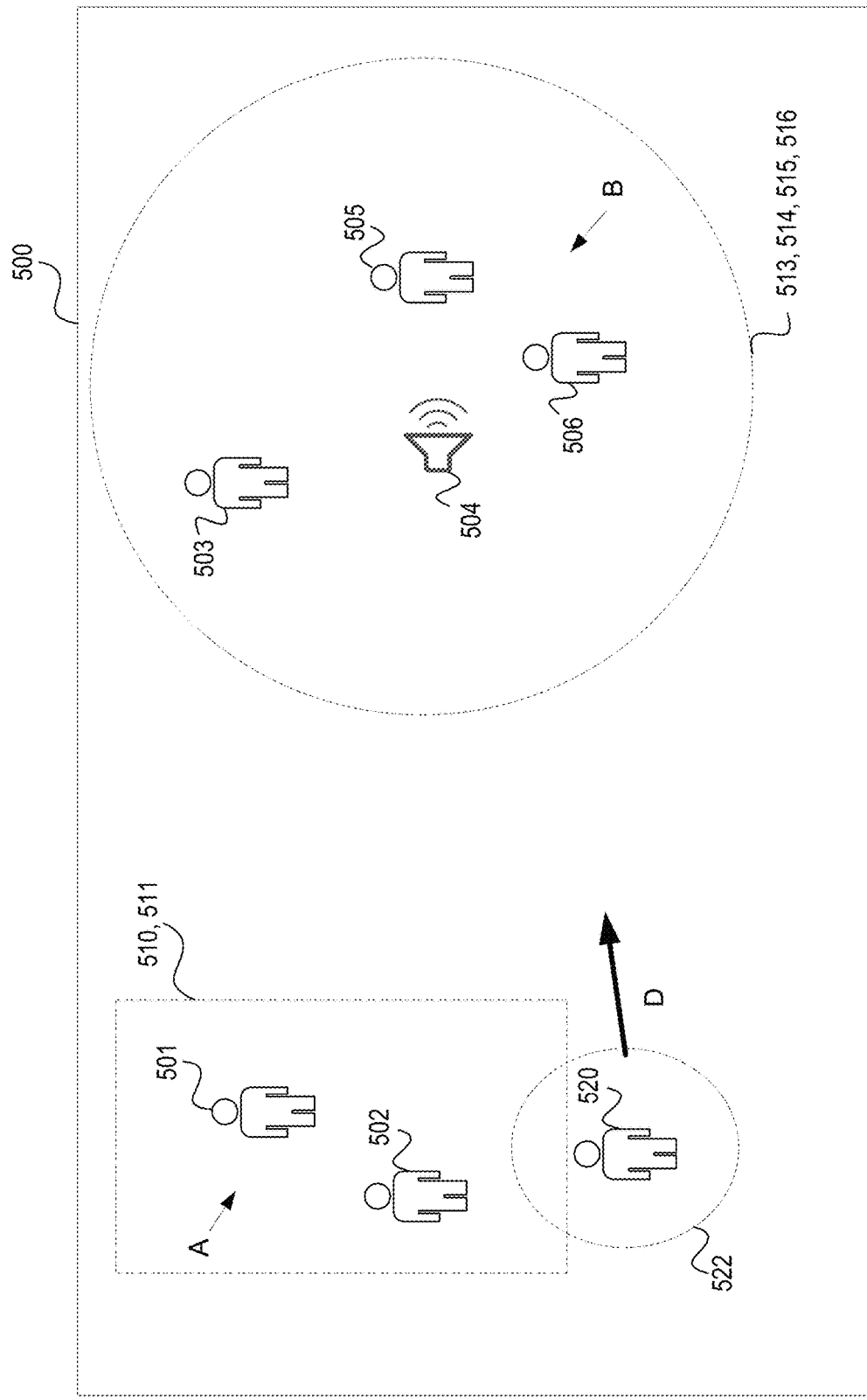

According to one or more aspects, the clustering process may further account for intent. In FIG. 5D, an audio source 520 is shown as entering into an area that is associated with cluster A, while moving in the direction of arrow D. Although audio source 520 would normally be clustered with audio sources 501 and 502 using existing clustering algorithms, the processing system may further consider whether the audio source 520 exhibits behavior which indicates that the source 520 does not intend to join that group or cluster A. In such a case, the processing system may override a result of the clustering analysis (or otherwise take the intent into account in the clustering analysis) and determine to not modify the spatial audio area 522 of audio source 520 to match cluster A and/or to not modify spatial audio areas 510 and 511 to include audio source 520. In this instance, because audio source 520 is continuing to move, and in a direction that would lead him away from cluster A, the clustering process according to aspects described herein might not add source 520 to cluster A and instead, delay any clustering decision until source 520 has maintained a particular position or general position for a specified amount of time. For example, if source 520 maintains a position close to audio source 503 for a period of time (e.g., 10 seconds, 1 minute, 5 minutes, etc.), the clustering process may then add him to cluster B and modify spatial audio areas accordingly.

Additionally or alternatively, as new audio sources enter into the area 500 or existing audio sources move or leave (e.g., detected as triggering events by the processing system), the processing system may dynamically and automatically update the clusters and spatial audio areas as needed.

Figure 6A:
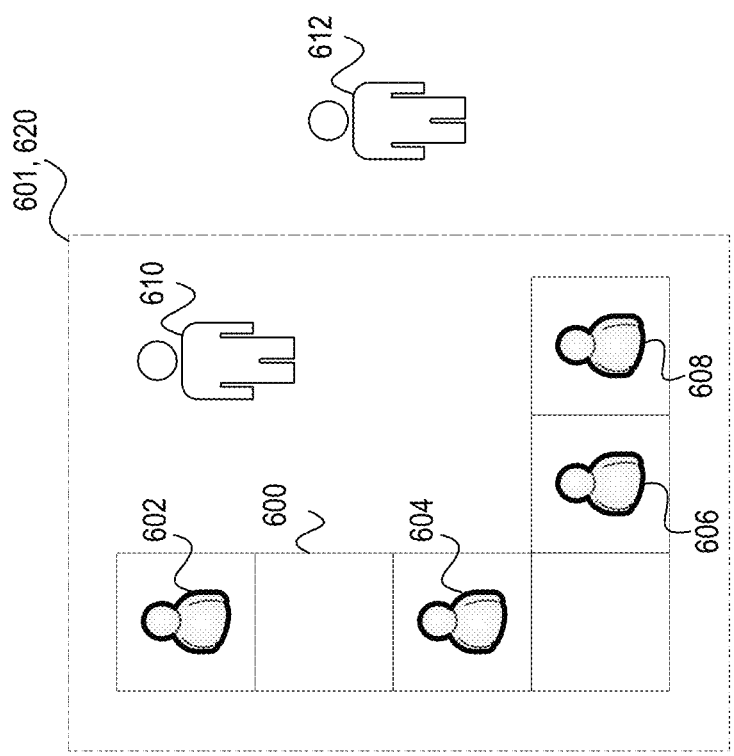
FIGS. 6A-6C illustrate examples of adjusting spatial audio areas based on contextual factors according to one or more illustrative aspects described herein.
Figure 6B:
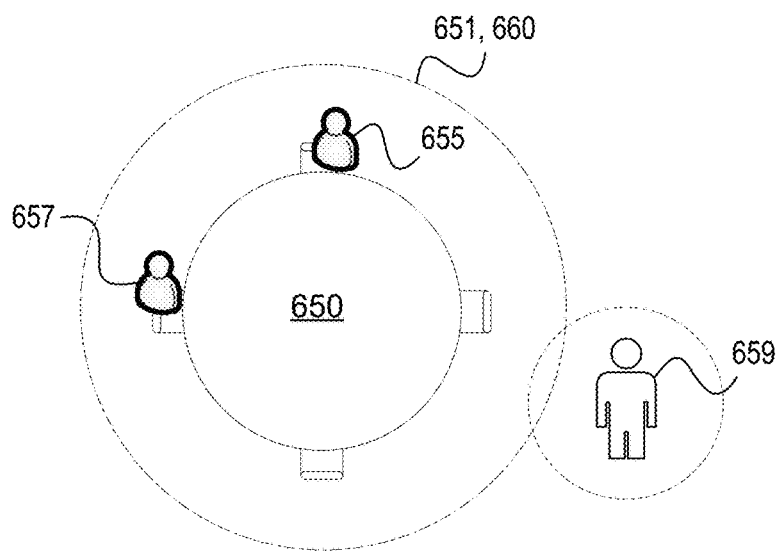
Figure 6C:
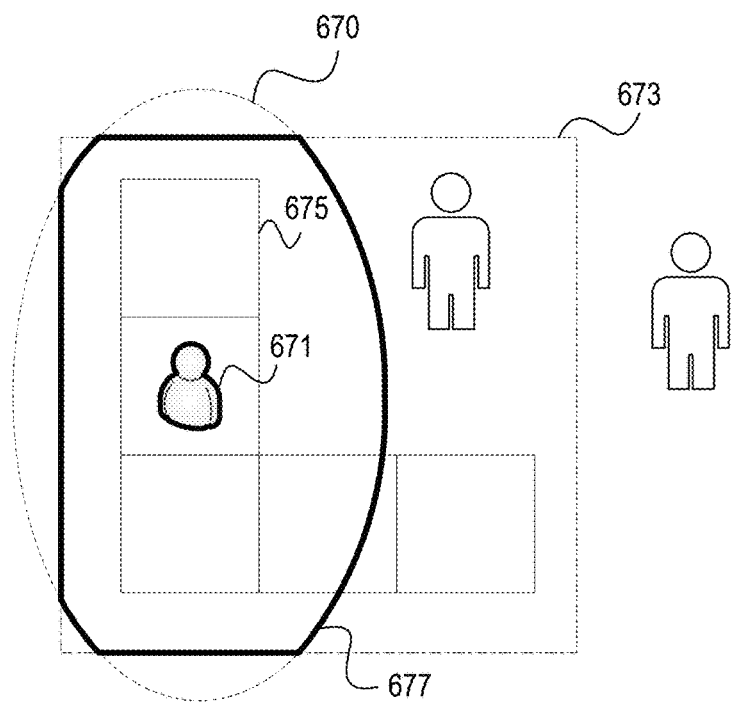

FIGS. 6A-6C illustrate other manners in which a spatial audio processing system may use context to adjust spatial audio areas for audio sources. In this example, the spatial audio processing may account for ambient elements of the environment such as furniture and other objects that have an audio context. An audio context may, for example, include information about how audio is to be transmitted and received in a specified area. In one arrangement, seating furniture such as a couch or a table and chairs may have an audio context that limits audio generated within a specified area to that area. That is, the generated audio is not conveyed to audio recipients (e.g., other audio sources or audio sinks) outside of the specified area. The shape, dimension and location of the area may be predefined in association with the furniture or other ambient element.

When such an audio context area is defined by an ambient or environmental element, spatial audio areas for audio sources associated with the ambient or environmental element may be modified to match or overlap the audio context area as discussed with respect to FIG. 3 (e.g., steps 313 and 335). FIG. 6A illustrates an L-shaped couch 600 having context area 601 and on which one or more audio sources may be seated. For example, audio sources 602, 604, 606, and 608 may be seated on couch 600 while audio sources 610 and 612 are located in varying proximity to couch 600. The processing system may consider an audio source to be associated with couch 600 based on a variety of considerations, including a proximity of the audio source to couch 600, whether the audio source is interacting with couch 600 (e.g., sitting, touching, etc.), whether the audio source is positioned within (or at least partially within) its context area 601, and the like and/or combinations thereof.

In FIG. 6A, the processing system may determine that audio sources 602, 604, 606, 608 and 610 are all associated with couch 600 since they are either interacting with couch 600 or within its context area 601. Accordingly, the processing system may modify each of audio sources 602, 604, 606, 608 and 610's spatial audio areas to correspond to the context area 601. In the illustrated example arrangement, the processing system modifies the spatial audio areas (collectively shown as area 620) of sources 602, 604, 606, 608 and 610 to match one another and to match the shape, size and location of context area 601. By doing so, the conversations or audio exchanged between sources 602, 604, 606, 608, and 610 are limited to the couch 600's context area 601 (and the audio sources positioned therein) such that user or object 612 cannot receive that that audio or otherwise hear the conversation. In other arrangements, the spatial audio areas of sources 602, 604, 606, 608, and 610 may be modified so that they each include all of the other sources without necessarily matching the shape, size, and location of context area 601 exactly.

FIG. 6B illustrates another example of ambient objects affecting size, shape, and/or location of an audio source's spatial audio area. In this example, table 650 defines a substantially round audio context area 651. Accordingly, processing system may adjust the spatial audio areas (collectively shown as 660) of audio sources 655 and 657 seated at the table to match the audio context area 651 in shape, size and location. Audio source 659, standing just outside table 650's audio context area 651, may be excluded from audio exchanged between sources 655 and 657.

FIG. 6C illustrates yet another example in which a processing system may modify an audio source's spatial audio area according to ambient objects having an audio context area. In this arrangement, processing system does not adjust an existing spatial audio area 670 of audio source 671 to exactly match the audio context area 673 of couch 675. Instead, audio source 671's existing spatial audio area 670 is modified to match or correspond to an overlapping area between audio context area 673 and audio source 671's existing spatial audio area 670. As shown in FIG. 6C, this modification results in adjusted spatial audio area 677 (shown as a solid line). Accordingly, in some arrangements, the audio context area of an ambient element may define or otherwise represent a boundary beyond which a spatial audio area of an audio source may not extend.

Figure 7B:
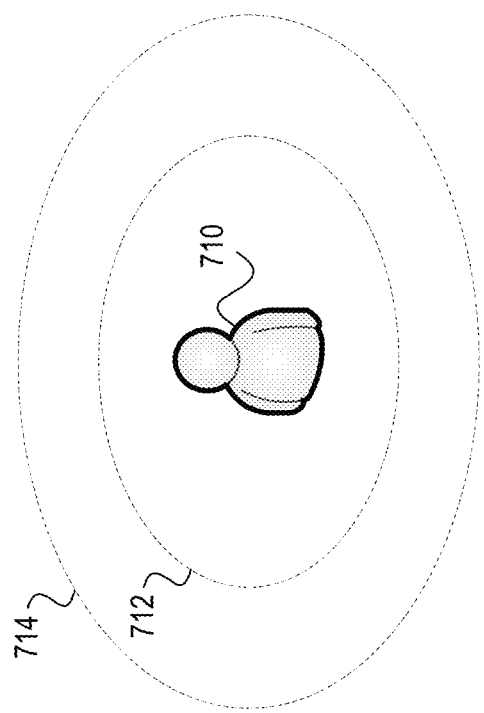
FIGS. 7A-7C illustrate examples of discerning audio source intent and modifying a spatial audio area based thereon according to one or more illustrative aspects described herein.
Figure 7A:
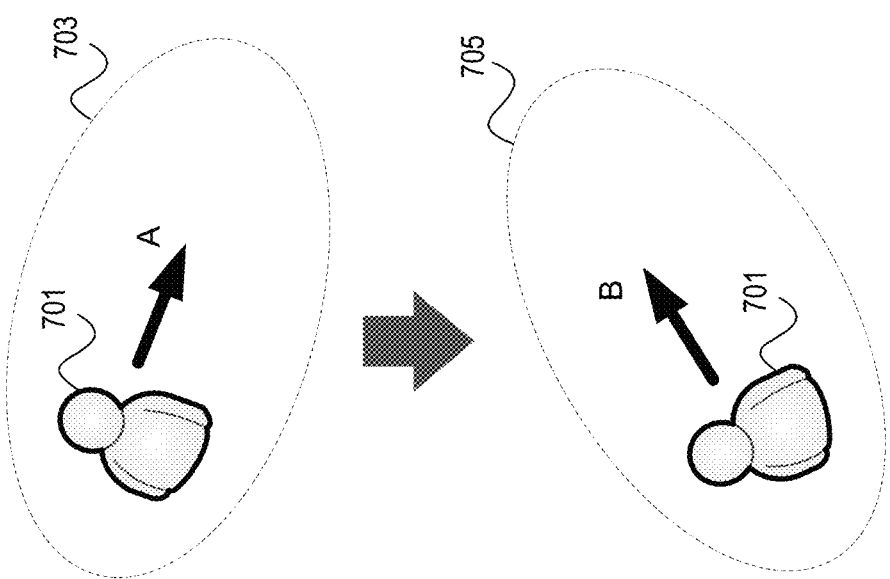
Figure 7C:
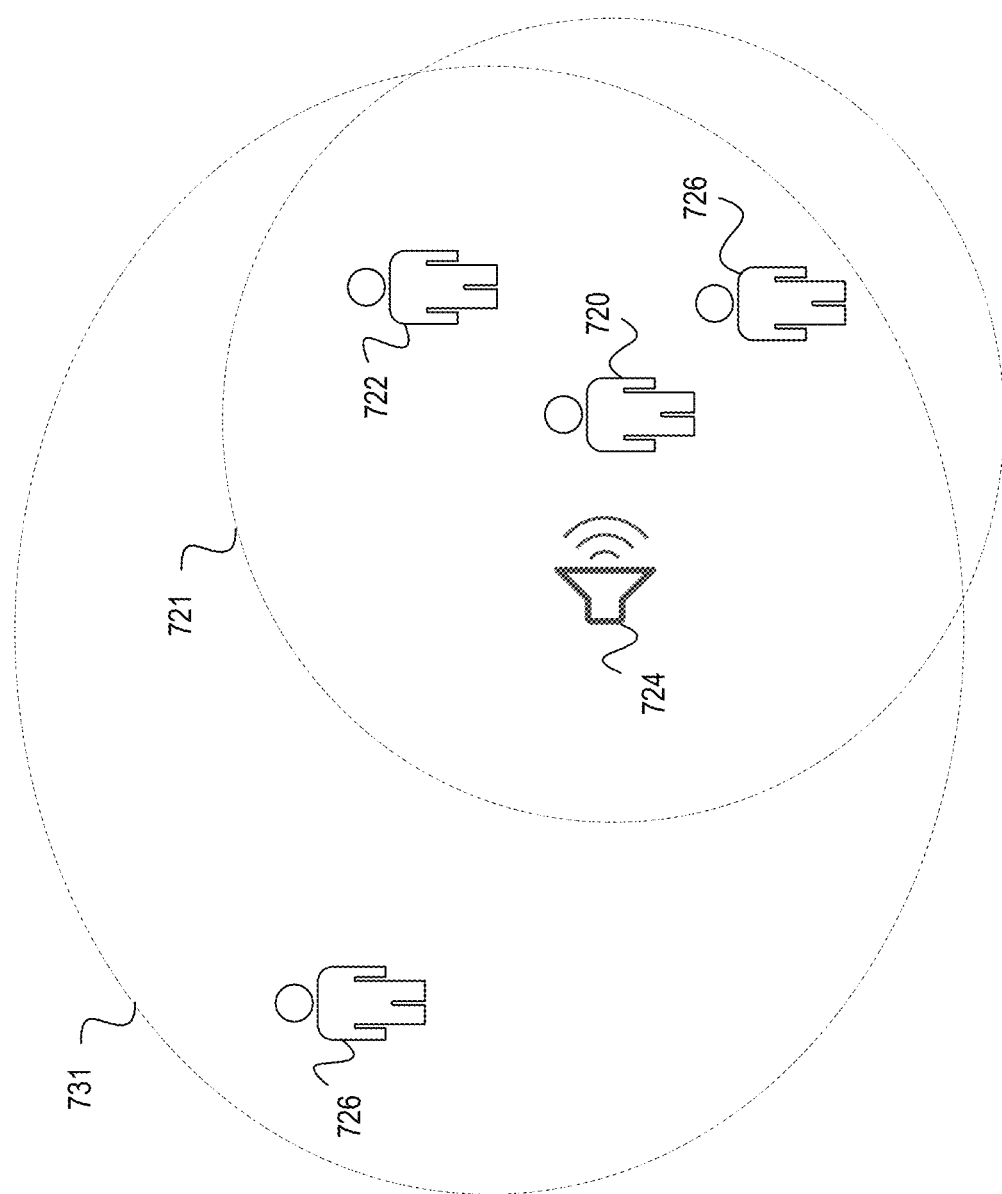

FIGS. 7A-7C illustrates further examples of dynamic spatial audio area adjustments. These examples depict how a spatial audio processing system may consider intent in determining an audio source's spatial audio area. Intent may be determined using a variety of attributes and factors including movements (including gestures) of the audio source, volume of the audio generated, and audio content. Other indicators of intent may be used as well. For example, FIG. 7A illustrates audio source 701 rotating the person's body (including head) such that the direction in which audio source 701 is speaking is changed from direction A to direction B. Based on this detected movement, the spatial audio processing system may determine that the user intends to direct his audio more particularly in direction B than in direction A. Accordingly, the processing system may change audio source 701's existing spatial audio area 703 to reflect this intent, resulting in new spatial audio area 705. As illustrated, new spatial audio area 705 has a larger area extending in direction B than does prior spatial audio area 703. At the same time, and in some examples, the size and shape of spatial audio areas 703 and 705 may remain the same. In other examples, the size and shape of spatial audio areas 703 and 705 may also change.

FIG. 7B illustrates spatial audio area modification resulting from changes in an audio source's volume. For example, audio source 710 may increase its volume resulting in an enlargement of its spatial audio area from prior area 712 to modified spatial audio area 714. In some examples, the spatial audio area might not be increased or decreased the same magnitude in all directions. Rather, and in one example, the spatial audio area might be increased more or less in the direction in which the audio source is directed.

FIG. 7C illustrates spatial audio area modification based on analyzing a content of generated audio. In this example, audio source 720 is clustered with audio sources 722 and 724, but not audio source 726. Accordingly, audio source 726 is not within audio source 720's existing spatial audio area 721. However, in some instances, audio source 720 may generate audio directed to audio source 726 despite audio source 726 being outside of audio source 720's spatial audio area 721. Spatial audio area 721 may also represent the individual spatial audio areas of sources 722, 724, and 726. The spatial audio processing system may determine that audio is directed to a particular audio source based on content analysis, as discussed with respect to FIG. 3. For example, the content of the audio may include the name of audio source 726. In one or more arrangements, the audio processing system may analyze the context in which the name of audio source 726 is being used—whether it is content directed at or otherwise intended for audio source 726 or whether it is simply content about audio source 726.

Upon detecting that audio source 720's audio is directed at audio source 726, spatial audio processing system may modify existing spatial audio area 721 of source 720 to include audio source 726. Spatial audio area 731 reflects and illustrates a resulting spatial audio area after such an adjustment. Additionally, source 726's spatial audio area may also be modified to match spatial audio area 731 to reflect the joining of source 726 to the cluster. Additionally or alternatively, in some examples, the modification to spatial audio area (i.e., resultant spatial audio area 731) of source 720 might have a predefined duration, at the expiration of which source 720's spatial audio area will revert to the pre-existing area 721. This duration may be extended if audio source 720 continues to direct communications to source 726.

According to some aspects, because the spatial audio processing system may already have provided the audio content generated by source 720 to sources 722 and 724 based on source 720's prior spatial audio area 721, the spatial audio processing system may further provide the audio content to audio source 726 in a separate step or process. In other words, the same audio may be provided in two different instances, once to sources in the pre-existing spatial audio area 721 and once to audio sources that were not in the pre-existing spatial audio area 721 but that have been added by virtue of the adjusted spatial audio area 731. This additional transmission or provision of the same audio content may be performed since, otherwise, audio source 726 might never receive source 720's audio content directed (and/or referring) to audio source 726. Alternatively, spatial audio processing system may introduce a delay to allow the system to process the audio content and modify any spatial audio areas as needed prior to providing the audio content to any sources and sinks.

Spatial audio area adjustment is not limited to virtual environments and may also be applied to real-world physical environments. For example, spatial audio area adjustment may be used where groups of individuals may physically gather for an event such as a conference. In such environments, there may be multiple spatial audio areas corresponding to different presentations, workshops, meetings, discussions, and the like. One or more of these areas may use electronic speakers to amplify and distribute audio to all participants of that meeting or discussion. However, and as discussed with respect to virtual environment, some individuals or entities may join or leave the discussion, meeting, presentation, etc. thereby necessitating an adjustment of the spatial audio area created by one or more electronic speakers to match the area occupied by participants. In other instances, the spatial audio area created by electronic speakers may be adjusted to more closely match a speaker's intent (e.g., a direction the speaker is facing or whether the speaker is shouting or whispering).

Figure 8A:
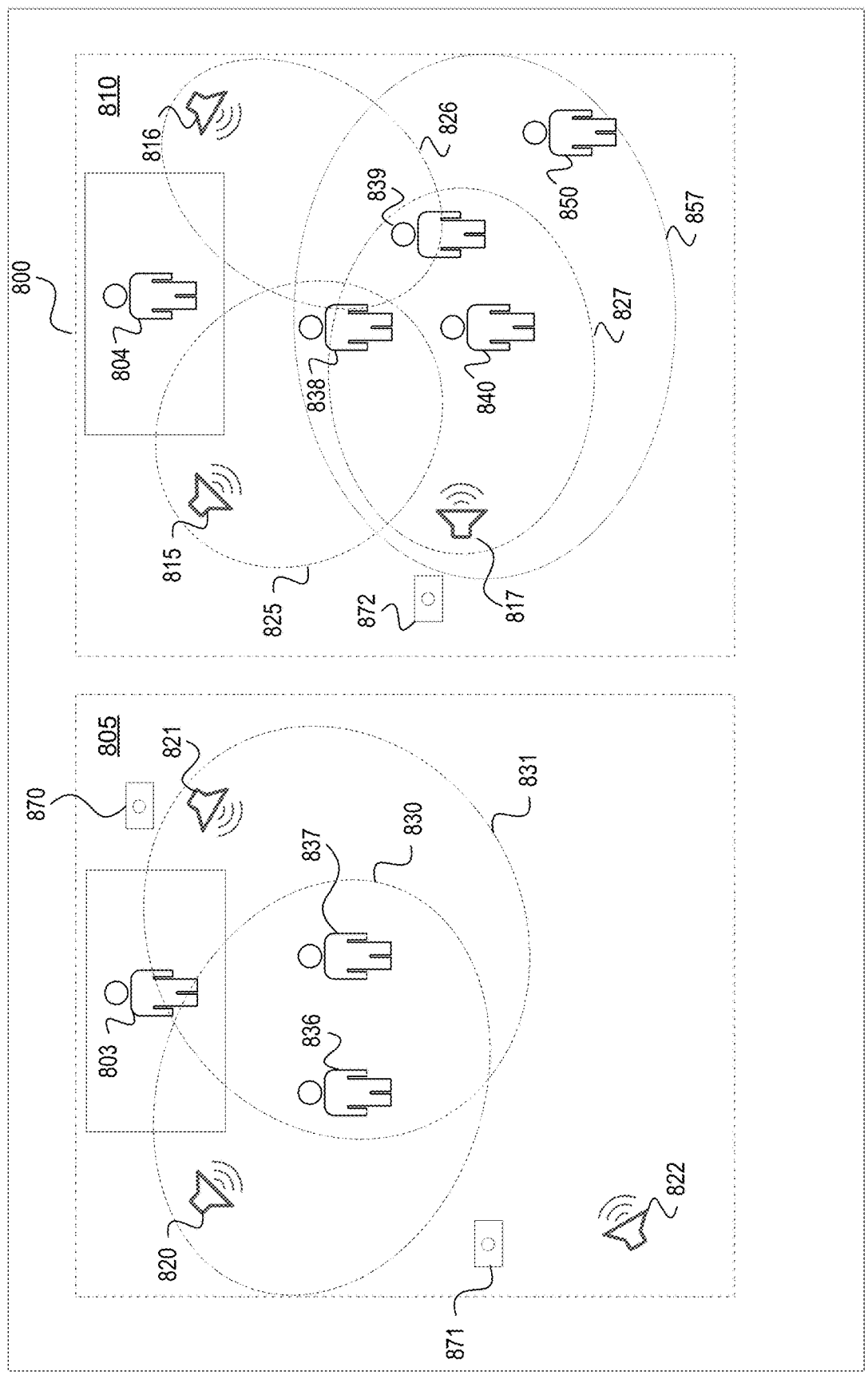
FIGS. 8A and 8B depict spatial audio processing in a physical real-world environment according to one or more illustrative aspects described herein.
Figure 8B:
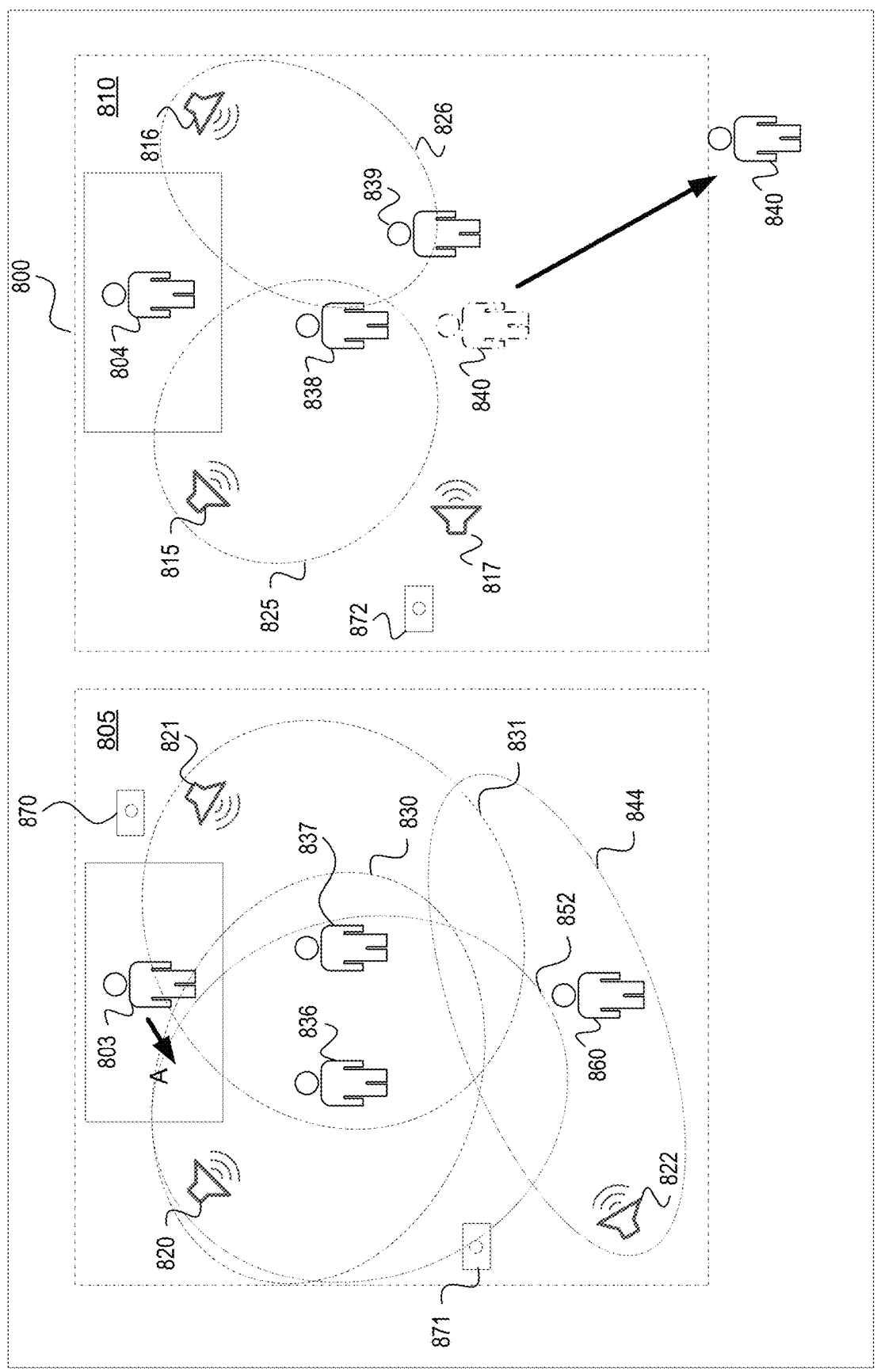

FIGS. 8A and 8B illustrate an example physical environment in which multiple individuals may be gathered for different meetings, discussions, or presentations. For example, environment 800 may be a conference center, a hotel meeting space, a meeting room, areas of a home or office, and the like. As shown in FIG. 8A, environment 800 may include a first meeting or discussion area 805 and a second meeting or discussion area 810. First area 805 may include multiple electronic speakers 820, 821, 822 to amplify and/or reproduce voice or other audio content, while second area 810 may similarly include multiple electronic speakers 815, 816, 817. These speakers may be collectively controlled or individually (e.g., separately) controlled or may be configurable for both types of control. Collectively, speakers 815, 816 and 817 may create a spatial audio area as a combination of their individual spatial audio areas 825, 826, 827, while speakers 820, 821, and 822 may similarly create a spatial audio area as a combination of their individual spatial audio areas 830, 831 (shown in FIGS. 8A and 8B), 832 (shown in FIG. 8B). Within each of areas 805 and 810 may be multiple participants 836, 837 and 838, 839, 840, respectively.

In FIG. 8A, the direction, size and/or shape of the audio from one or more of speakers 815, 816, 817, 820, 821, and 822 may be modified based on an intent of an audio source such as presenters or human speakers 803 and 804. In one example, as a new participant 850 joins discussion 810 (e.g., by virtue of their proximity to or entering within the boundaries of area 810), spatial audio area 827 of speaker 817 may be expanded to include participant 850, resulting in modified spatial audio area 857. Expanding spatial audio area 827 may include identifying a closest audio source (e.g., electronic speaker 817) to the new participant 850 and increasing the volume of that audio source 817. In some examples, the volume (and therefore, the spatial audio areas) of other speakers 815 and 816 may remain the same.

In another instance, the spatial audio area of area 805 (as defined by spatial audio areas 830 and 831) may be modified when the presenter 803 turns in a particular direction or changes volume (e.g., by a predefined amount). For example, referring to FIG. 8B, when presenter 803 rotates or directs audio in direction A, spatial audio area 830 of speaker 820 may be rotated to reflect the change in the presenter 803's direction, resulting in modified spatial audio area 852. For example, speaker 820 (or some portions thereof) may be rotatable/tiltable in various directions. Such rotation or tilting may be used, for example, to match the direction in which the presenter 803 is facing. In another example, speaker 820 may have multiple speaker portions that can be selectively activated or deactivated to adjust the shape of the spatial area defined thereby. In some examples, spatial audio area may also be re-shaped or re-sized as needed.

FIG. 8B also illustrates a further example of spatial audio modification. In particular, when a new participant 860 enters an area indicating an intent to join discussion area 810, the system may activate a previously un-activated speaker such as speaker 822 to redefine and expand the spatial audio area for discussion area 805 by adding a further spatial audio area 844. Similarly, upon detecting a participant leaving the meeting or discussing (e.g., participant 840 leaving area 810), a corresponding speaker (e.g., speaker 817) may be deactivated if that portion of the combined spatial audio area (i.e., spatial audio area 827 as shown in FIG. 8A) no longer includes any participants. In some instances, spatial audio area 826 might be enlarged in response to deactivation of speaker 817 to ensure that participant 839 is able to clearly and fully hear the audio of presenter 804.

Detecting intent or changes to participant or presenter behavior may be accomplished in a variety of ways. In FIGS. 8A and 8B, multiple sensors may be used to detect movement, position and orientation. For example, cameras 870, 871, and 872 may be used to detect movement and position of individuals within each or both areas 805 and 810. Additionally or alternatively, motion sensors may be used to detect movement. In further examples, wearable accelerometers may be used to detect movement, gestures and/or changes in orientation (e.g., head position or hand position). Audio sensors may also be used to detect ambient sound levels as a further input to dynamically adjusting the spatial audio area. For example, if the audio sensors indicate that there is a threshold level of noise within a certain portion of area 810, the system may increase the volume of a speaker (e.g., speaker 822) responsible for the audio production in that area. Various other types of sensors and spatial audio area modification algorithms using sensor data may be used.

The following paragraphs (M1) through (M15) describe examples of methods that may be implemented in accordance with the present disclosure.

(M1) A method comprising: determining a location for each of a plurality of audio sources within a virtual environment; determining a plurality of audio groups for the plurality of audio sources based on the determined locations, the plurality of groups including: a first audio group including at least a first audio source of the plurality of audio sources; and a second audio group including at least a second audio source of the plurality of audio sources; detecting audio from the first audio source; providing the audio from the first audio source only to one or more other audio sources of the plurality of audio sources within the first audio group; detecting movement of at least one of the first audio source and the second audio source; and adjusting membership of at least one of the first audio group and the second audio group in response to detecting the movement.

(M2) A method may be performed as described in paragraph (M1), wherein determining the plurality of audio groups including using a clustering algorithm using the determined locations of the plurality of audio sources.

(M3) A method may be performed as described in paragraph (M1) or paragraph (M2), wherein determining a plurality of audio groups includes: modifying a first spatial audio area of the first audio source to include all audio sources in the first audio group, wherein audio generated by the first audio source is transmitted only to the audio sources within the first spatial audio area.

(M4) A method may be performed as described in paragraph (M3), wherein detecting audio from the first audio source includes: determining a volume of the detected audio; and adjusting at least one of a shape and a size of the first spatial audio area based on the determined volume.

(M5) A method may be performed as described in paragraph (M3) or paragraph (M4), wherein detecting the movement of at least one of the first audio source and the second audio source includes detecting a change in orientation of the first audio source, and wherein adjusting the membership of at least one of the first audio group and the second audio group in response to detecting the movement includes modifying at least one of a shape and a size of the first spatial audio area of the first audio source.

(M6) A method may be performed as described in paragraph (M5), wherein the change in orientation includes a user gesture.

(M7) A method may be performed as described in paragraph (M5) or paragraph (M6), wherein the change in orientation includes a head movement of a user corresponding to the first audio source.

(M8) A method may be performed as described in any of paragraphs (M1) through (M7), wherein the first spatial audio group is defined based on at least one of a size and shape of a first object in the virtual environment, the first object being a non-audio source.

(M9) A method comprising: determining a location of each of a plurality of audio sources within a virtual environment; determining at least one of a size and a shape of an object within the virtual environment; determining that the location of a first audio source corresponds to a location of the object; modifying a first spatial audio area specific to the first audio source based on the at least one of the size and the shape of the object; detecting audio from the first audio source; and providing the audio from the first audio source to one or more audio receivers within the first spatial audio area specific to the first audio source, but not to any audio sources outside of the first spatial audio area.

(M10) A method may be performed as described in paragraph (M9), wherein the object is furniture.

(M11) A method may be performed as described in paragraph (M9) or paragraph (M10), wherein determining that the location of the first audio source corresponds to the location of the object includes determining that the location of the first audio source is within a predefined proximity to the location of the object.

(M12) A method may be performed as described in any of paragraphs (M9) through (M11), wherein modifying the first spatial audio area specific to the first audio source based on the at least one of the size and the shape of the object includes: determining a predefined audio context area specific to the object; determining an overlapping area between the first spatial audio area and the predefined audio context area; and modifying the first spatial audio area to match the determined overlapping area.

(M13) A method may be performed as described in any of paragraphs (M9) through (M12), wherein determining that the location of the first audio source corresponds to the location of the object includes: determining that the first audio source is within a predefined proximity to the object.

(M14) A method may be performed as described in any of paragraphs (M9) through (M13), wherein determining that the location of the first audio source corresponds to the location of the object includes: determining that the first audio source is contacting the object.

(M15) A method may be performed as described in any of paragraphs (M9) through (M14), wherein determining that a location of a second audio source corresponds to a location of the object, the method further comprising: modifying a second spatial audio area specific to the second audio source based on the at least one of the size and the shape of the object, wherein the second spatial audio area does not include the first audio source.

The following paragraphs (CRM1) through (CRM5) describe examples of computer-readable media storing computer-readable instructions that may be implemented in accordance with the present disclosure.

(CRM1) A computer-readable medium storing computer-readable instructions that, when executed, cause an apparatus to: determine a location for each of a plurality of audio sources within the virtual environment; define a spatial audio area for each of the plurality of audio sources; detect audio from the first audio source; provide the audio from the first audio source to one or more audio recipients located within a first spatial audio area specific to the first audio source, but not to any audio sources outside of the first spatial audio area; determining an intent of the first audio source; and adjusting at least one of a size, shape, and location of the first spatial audio area based on the determined intent of the first audio source.

(CRM2) A computer-readable medium may store computer-readable instructions as described in paragraph (CRM1), wherein determining the intent of the first audio source includes detecting a user gesture.

(CRM3) A computer-readable medium may store computer-readable instructions as described in paragraph (CRM1) or paragraph (CRM2), wherein determining the intent of the first audio source includes detecting a head movement of a user corresponding to the first audio source.

(CRM4) A computer-readable medium may store computer-readable instructions as described in any of paragraphs (CRM1) through (CRM3), wherein determining the intent of the first audio source includes: detecting movement of the first audio source; and performing a clustering analysis of the plurality of audio sources based on the detected movement of the first audio source, the clustering analysis configured to group the plurality of audio sources into one or more audio groups.

(CRM5) A computer-readable medium may store computer-readable instructions as described in paragraph (CRM4), wherein the computer-readable instructions, when executed, further cause the apparatus to: modify the first spatial audio area of the first audio source to include all audio sources in a first audio group, wherein audio generated by the first audio source is transmitted to the audio sources in the first audio group, but not to audio sources outside of the first audio group.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   determining a location for each of a plurality of audio sources within a virtual environment;
   determining a plurality of audio groups for the plurality of audio sources based on the determined locations, the plurality of groups including:
     a first audio group including at least a first audio source of the plurality of audio sources; and
     a second audio group including at least a second audio source of the plurality of audio sources;
   detecting audio from the first audio source;
   providing the audio from the first audio source only to one or more other audio sources of the plurality of audio sources within the first audio group;
   detecting movement of at least one of the first audio source and the second audio source; and
   adjusting membership of at least one of the first audio group and the second audio group in response to detecting the movement;
   wherein:
   determining the plurality of audio groups includes modifying a first spatial audio area of the first audio source to include all audio sources in the first audio group, wherein audio generated by the first audio source is transmitted only to the audio sources within the first spatial audio area; and
   detecting audio from the first audio source includes:
     determining a volume of the detected audio; and
     adjusting at least one of a shape and a size of the first spatial audio area based on the determined volume.

2. The method of claim 1, wherein determining the plurality of audio groups including using a clustering algorithm using the determined locations of the plurality of audio sources.

3. The method of claim 1, wherein detecting the movement of at least one of the first audio source and the second audio source includes detecting a change in orientation of the first audio source, and wherein adjusting the membership of at least one of the first audio group and the second audio group in response to detecting the movement includes modifying at least one of a shape and a size of the first spatial audio area of the first audio source.

4. The method of claim 3, wherein the change in orientation includes a user gesture.

5. The method of claim 3, wherein the change in orientation includes a head movement of a user corresponding to the first audio source.

6. The method of claim 1, wherein the first spatial audio group is defined based on at least one of a size and shape of a first object in the virtual environment, the first object being a non-audio source.

7. A method comprising:
  determining a location of each of a plurality of audio sources within a virtual environment;
  determining at least one of a size and a shape of an object within the virtual environment;
  determining that the location of a first audio source corresponds to a location of the object;
  modifying a first spatial audio area specific to the first audio source based on the at least one of the size and the shape of the object;
  detecting audio from the first audio source; and
  providing the audio from the first audio source to one or more audio receivers within the first spatial audio area specific to the first audio source, but not to any audio sources outside of the first spatial audio area.

8. The method of claim 7, wherein the object is furniture.

9. The method of claim 7, wherein determining that the location of the first audio source corresponds to the location of the object includes determining that the location of the first audio source is within a predefined proximity to the location of the object.

10. The method of claim 7, wherein modifying the first spatial audio area specific to the first audio source based on the at least one of the size and the shape of the object includes:
  determining a predefined audio context area specific to the object;
  determining an overlapping area between the first spatial audio area and the predefined audio context area; and
  modifying the first spatial audio area to match the determined overlapping area.

11. The method of claim 7, wherein determining that the location of the first audio source corresponds to the location of the object includes:
  determining that the first audio source is within a predefined proximity to the object.

12. The method of claim 7, wherein determining that the location of the first audio source corresponds to the location of the object includes:
  determining that the first audio source is contacting the object.

13. The method of claim 7, wherein determining that a location of a second audio source corresponds to a location of the object, the method further comprising:
  modifying a second spatial audio area specific to the second audio source based on the at least one of the size and the shape of the object, wherein the second spatial audio area does not include the first audio source.

14. A computer-readable medium storing computer-readable instructions that, when executed, cause an apparatus to:
  determine a location for each of a plurality of audio sources within the virtual environment;
  determining a plurality of audio groups for the plurality of audio sources based on the determined locations, the plurality of groups including:
    a first audio group including at least a first audio source of the plurality of audio sources: and
    a second audio group including at least a second audio source of the plurality of audio sources
  define a spatial audio area for each of the plurality of audio sources;
  detect audio from the first audio source;
  provide the audio from the first audio source to one or more audio recipients located within a first spatial audio area specific to the first audio source, but not to any audio sources outside of the first spatial audio area;
  determining an intent of the first audio source; and
  adjusting at least one of a size, shape, and location of the first spatial audio area based on the determined intent of the first audio source;
  wherein:
    determining the plurality of audio groups includes modifying a first spatial audio area of the first audio source to include all audio sources in the first audio group, wherein audio generated by the first audio source is transmitted only to the audio sources within the first spatial audio area; and
    detecting audio from the first audio source includes:
      determining a volume of the detected audio; and
      adjusting at least one of a shape and a size of the first spatial audio area based on the determined volume.

15. The computer-readable medium of claim 14, wherein determining the intent of the first audio source includes detecting a user gesture.

16. The computer-readable medium of claim 14, wherein determining the intent of the first audio source includes detecting a head movement of a user corresponding to the first audio source.

17. The computer-readable medium of claim 14, wherein determining the intent of the first audio source includes:
  detecting movement of the first audio source; and
  performing a clustering analysis of the plurality of audio sources based on the detected movement of the first audio source, the clustering analysis configured to group the plurality of audio sources into one or more audio groups.

18. The computer-readable medium of claim 17, wherein the computer-readable instructions, when executed, further cause the apparatus to:
  modify the first spatial audio area of the first audio source to include all audio sources in a first audio group, wherein audio generated by the first audio source is transmitted to the audio sources in the first audio group, but not to audio sources outside of the first audio group.

* * * * *